Dec. 25, 1956  F. R. HARRIS  2,775,095
METHOD OF ERECTING STRUCTURES IN WATER
Filed April 22, 1949  3 Sheets-Sheet 1
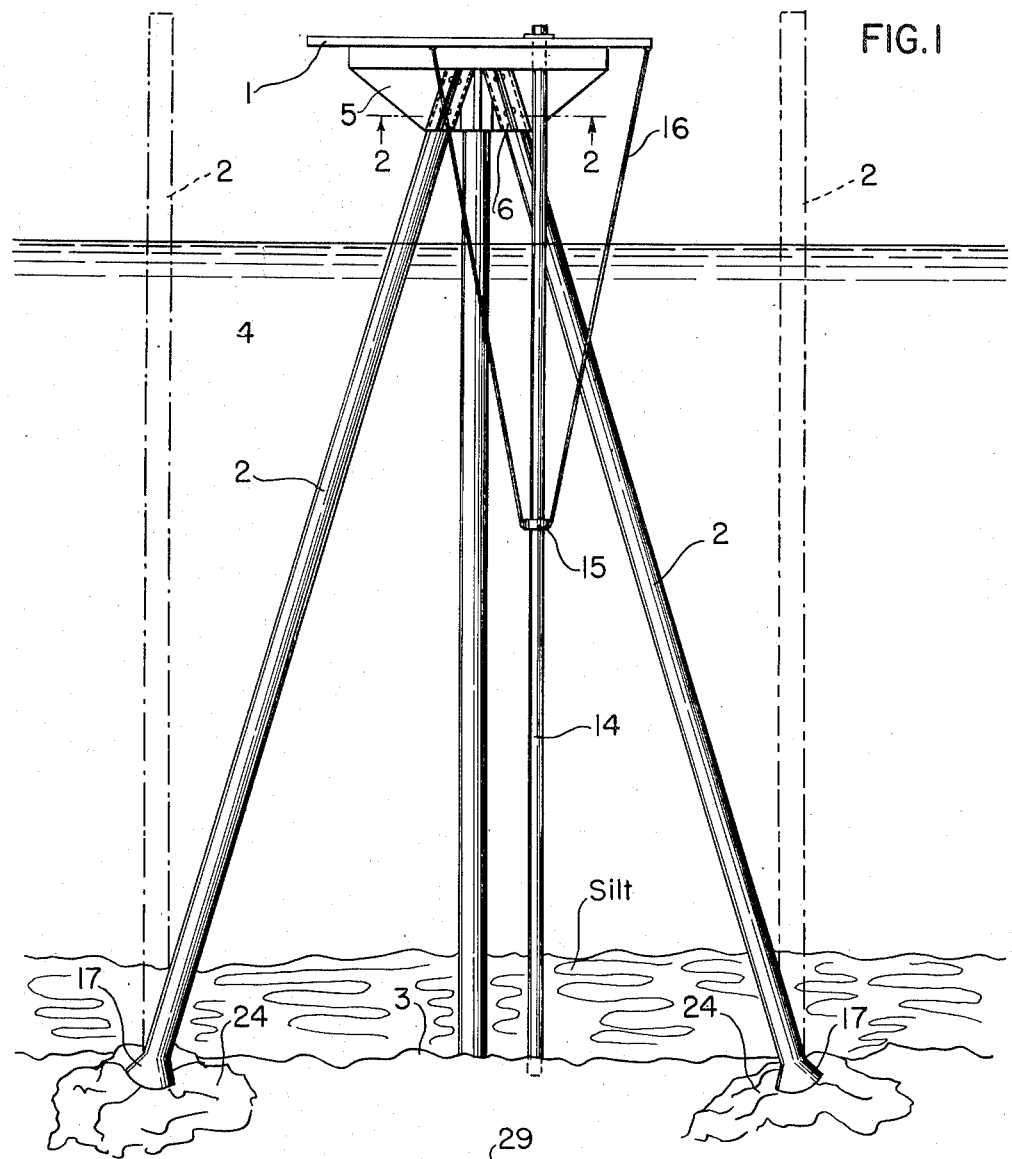
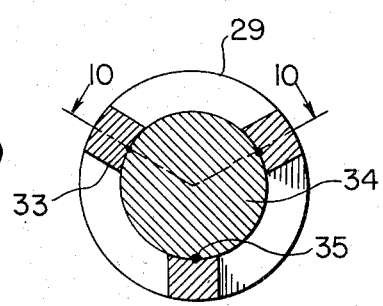
INVENTOR.
Frederic R. Harris
BY
William F. Nickel
Attorney Dec. 25, 1956     F. R. HARRIS     2,775,095
METHOD OF ERECTING STRUCTURES IN WATER
Filed April 22, 1949     3 Sheets-Sheet 2
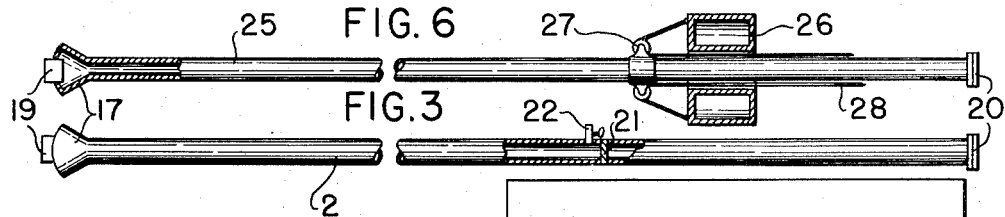
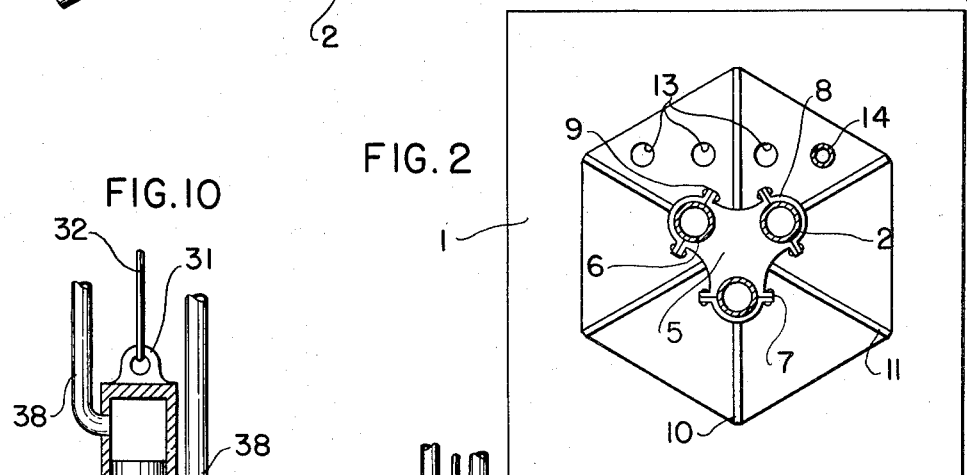
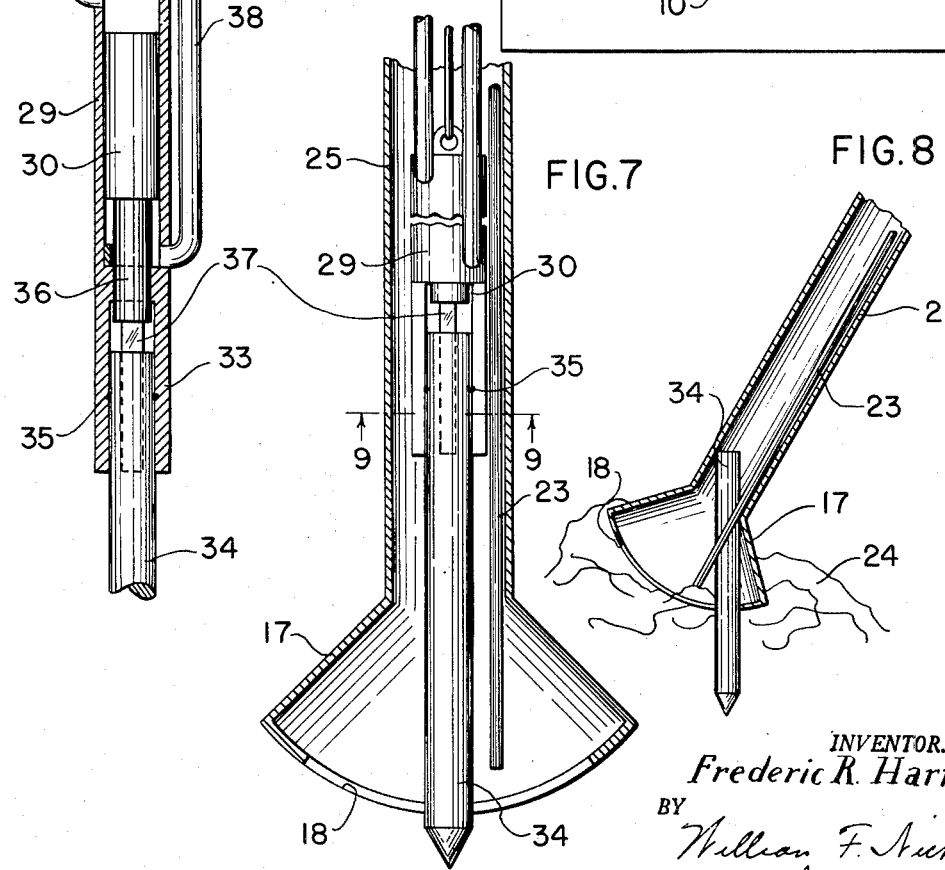
INVENTOR.
Frederic R. Harris
BY

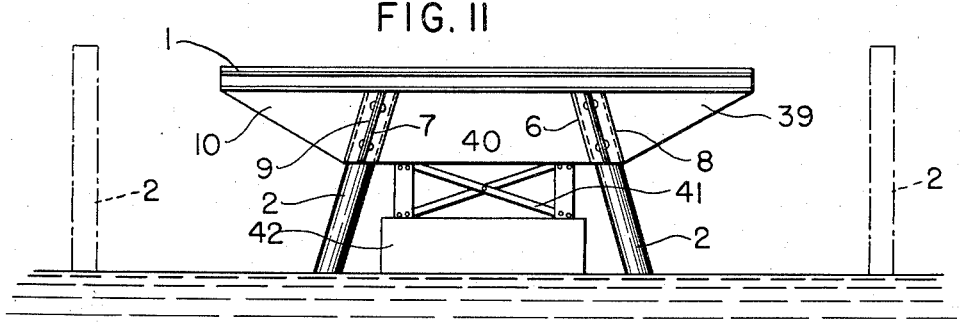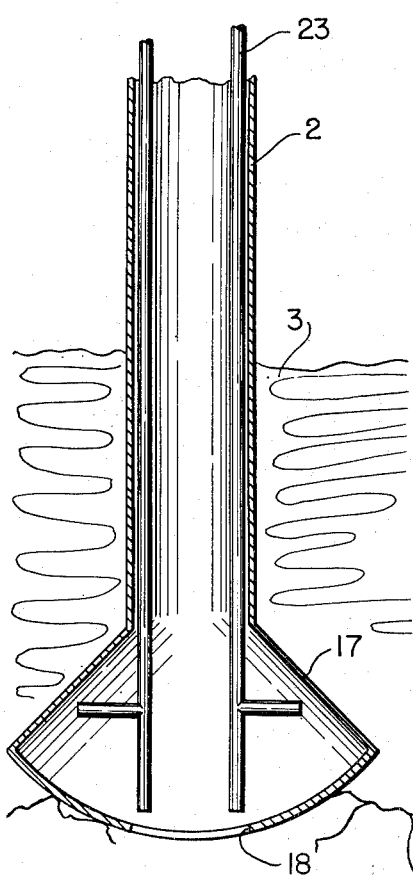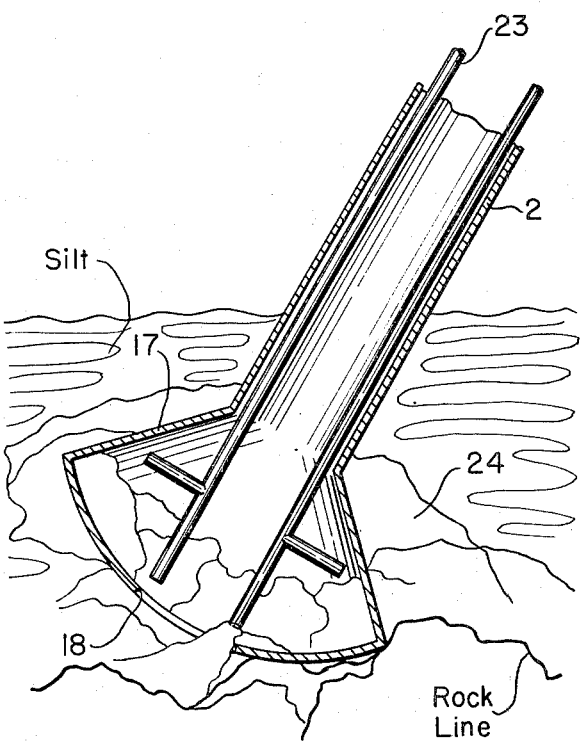

United States Patent Office 2,775,095
Patented Dec. 25, 1956

2,775,095

METHOD OF ERECTING STRUCTURES IN WATER

Frederic R. Harris, New York, N. Y.; Michael S. Lobenthal, Monroe Percy Bloch, and Florence B. Downs, executors of said Frederic R. Harris, deceased, assignors to Frederic R. Harris, Inc., New York, N. Y., a corporation of New York Application April 22, 1949, Serial No. 89,002

2 Claims. (Cl. 61—46)

This invention is an improved method and apparatus for erecting structures in water; especially structures in water of considerable depth for the support of platforms, towers and other equipment to drill for oil in the earth under the water; or to serve other purposes, as may be required.

An important object of this invention is to provide a structure capable of supporting heavy and uneven loads above the surface of the water, and resisting wind and wave action. The structure includes a platform and piles which are secured to the bottom and caused to incline towards one another, being connected at the tops and with their upper portions projecting above the water and having the platform affixed to said portions. The structure is particularly adapted to carry the machinery of an oil drilling rig.

The invention also comprises a novel type of pile which has the form of a hollow metal column, with means for rendering the upper portion more buoyant, so that the piles can be submerged in virtually upright position. Each pile is also constructed with means for enabling it to be maintained in place at its lower end on the bottom under the water, and therefore the piles themselves do not have to be driven into the bottom to embed their lower ends in position. Hence much time and labor are saved in the method of installation.

Other objects and the nature and advantages of the invention are set forth in the ensuing description; and one or more embodiments of the invention are illustrated in the drawings. But the disclosure is explanatory and not restrictive; for variations in the details of structure and mode of proceeding can be made without deviation from the essential characteristics of the invention as broadly defined in the appended claims.

On the drawings:

Figure 1 is a side view of the completed structure.

Figure 2 is a horizontal section on line 2—2 in Figure 1, showing in bottom plan the junction member at the upper ends of the piles.

Figure 3 is a side view partly in section of one of the piles.

Figure 4 is a longitudinal section of the lower part of said pile, when first lowered to the bottom.

Figure 5 is a similar view showing said pile in final anchored position, in final position on the bottom.

Figure 6 is a view similar to Figure 3 showing another hollow pile of different construction.

Figure 7 is a longitudinal sectional view of said other pile showing the lower end only.

Figure 8 is a similar view with said pile in slanting position and secured in place on the bottom.

Figure 9 is a cross section on line 9—9 in Figure 7.

Figure 10 is a vertical section on line 10—10 in Figure 9; showing a power unit with piston inside; and Figure 11 shows a modified design of structure with platform and legs.

On Figures 1, 2, 3, 4 and 5, numeral 1 indicates a platform which is supported on columns 2 standing upon the bottom 3 under a body of water 4 where the equipment is needed. The columns or legs 2 are shown as three in number but obviously more may be used if desired. Their lower ends are separated and are spaced apart at equal intervals. They are inclined from the lower ends upward and united at the tops by a junction member 5, having semi-cylindrical sloping seats 6 along the opposite edges of which are retaining flanges 7. The top of each column is clamped in its seat 6 by a semi-cylindrical element 8 having flanges or ribs 9 that are bolted or otherwise permanently secured to the flanges 7. The member 5 can be made by welding, casting or otherwise and it has a flat upper surface from which the seats 6 project in a downward and outward direction. Each of the clamping sections 8 has an arm or rib 10 made in one piece therewith and projecting from the outer curved surface and the bottom of the member 5 has ribs 11 projecting outward between the seats; so that the under face of the member 5 has the appearance of a six-legged spider, all of the ribs having upper edges in the same plane so that the platform 12 of one can rest thereon. This platform may be round or have any other outline. The top may have one or more openings 13 through each of which may be passed a tubular casing 14 to be driven down into the bottom 3 and to receive the drilling line. These casings have outside collars 15 and are braced by connections 16 between the collar and the platform. The seats 6 and ribs 11 are of course integral with the member 5.

The lower end of each column, which is tubular and has the form of a long hollow pipe, is expanded to make an enlarged head 17, and this head, as well as the entire length of each column, is hollow. Each head 17 has a large opening 18 which is closed by a plug 19. The top of each column bears a cover 20, which is of course removable. Within each column is a transverse partition 21, below which is an air vent cock 22. The columns, being hollow, will float in a horizontal position, when lowered into the water with the plugs 19 and covers 20 tight. When it is desired to sink them the plugs 19 are removed so that water can enter into the lower ends of the columns and fill the interior space up to the partitions 21. The lower parts of the columns will thus be overweighted, while the upper ends remain buoyant, so that they can be submerged in vertical position. The valves 22 are opened when the plugs 19 are removed to let out the air.

The columns also have pipe lines 23 therein which extend from the heads 17 through the partitions 21 and the top covers 20. The upper ends of these lines can be capped when the columns are submerged, and later uncapped and coupled to water pumps; so that when the lower ends of columns reach bottom 3, water can be driven through the pipes 23 to excavate the bottom and allow the heads 17 to sink to some depth. When the heads 17 rest firmly on the bottom, liquid concrete in the form of grout or in such state as to be suitable for "tremie" pouring, is supplied under pressure to the pipes 23 to accumulate in a mass 24 in and around each of the heads 17; and when this concrete sets each of the pipes has its own foundation and is securely held in place. The upper ends are first pulled towards one another and connected to the head 5. The tops of the channels are thus disposed in the seats 6, and the sections 8 attached. The concrete is then poured down through the pipes 23; then the platform 1 is built on; and the structure, except for equipment to be mounted on the platform is finished. The pipes 23 can have branched lower ends as shown, and openings in the sides of the heads 17.

In Figures 6, 7 and 8, hollow columns 25 are shown with a somewhat different construction. They are sealed by top covers 20 at the upper ends and are surrounded on the exterior with buoyancy collars 26. These members have the form of a hollow annular jacket located on the column 25 at a point below the top. At opposite sides of each column below the member 26, are mounted pulleys 27 on fixed brackets bearing journals on which the pulleys rotate; and cords or chains 28 are attached to the under sides of the jackets 26, passed down and under these pulleys and up through the central openings in the collars to the top, where they can be attached to hooks or cleats not shown. These collars give buoyancy to the upper parts of the columns and hold them in upright position when they are to be lowered to the bottom. The space between the jacket and the column allows movement of the chains 28 for adjusting the jackets 26.

In the lower end of each column 25, above the head 17 is a power unit or cylinder 29. This cylinder contains a movable piston or power hammer 30 and at its upper end is a fast ring or eyelet 31 to which is affixed a cable 32 that passes upward through the central bore of the column 25. The cylinder has guides 33 projecting from its lower end to receive the upper end of a pointed stake 34, which is weakly spot-welded to these guides as indicated at 35. The hammer 30 has a shank projecting from the lower end of the cylinder in position to strike the stake 34, and the shank or extension may have a projection 37 which movably enters a bore in the upper end of the stake to give a further guiding action. The cylinder has attached to it hose or pipe lines leading to ports at each end of the cylinder, so that by means of compressed air or some other medium the hammer can be raised and lowered to make its power stroke.

When these columns are sunk the stake 34 is affixed to the guides 33, and the cylinder is lowered into each column in turn by means of the cable 32. The cover 20 can be removed and the cable 32 is engaged at its upper end in any feasible manner. The pipes 38 of course are attached to the cylinder. Water is first run in through the pipe 23 to embed the heads 17, and as soon as the column is set up power unit is dropped down into it and then the stake can be driven into the bottom 3 to anchor it in place. At this time the air hammer 30 is at the top of the chamber 29 and when air is admitted to the upper end of the cylinder, the hammer is forced down against the upper end of the stake, breaking the welded junctions 35, which are not very strong and driving the stake into the bottom. Air is now admitted below the hammer and the stroke repeated. Any suitable mechanism is employed to admit air and exhaust it in turn through each pipe 38. The projecting shank of the hammer is shown at 36.

When the stakes 34 are firmly embedded, the tops of the columns are pulled together and secured in the seats 6. Liquid concrete as before is now supplied through the conduits 23 in the columns, so as to fill the heads and mass the material around the stakes 34 and heads 17. After being used the power unit is pulled out by the cable 32. The stakes remain vertical, but each of the columns is tilted as illustrated in Figure 8. The shape of the heads 17 permits the inclination of the columns to a sufficient extent to enable the head or member 5 to be attached to all of them, and the concrete soon hardens to anchor all the columns in place on the bottom 3. If rock is encountered under the stakes 34, a drill can be used first to bore out the rock to a sufficient extent to receive the stakes. The structure can be built in large sizes, with columns several feet in diameter and, for example, two hundred feet long.

In Figure 11, the structure is shown as having four columns with the platform at the top. These columns are inclined upward towards one another as before and are united by a member 39 having seats 6 joined in pairs by webs 40, and the covers 8 have projecting webs or flanges 10; but are farther apart at their upper ends, so as to give room for a barge 42 to be pushed between them. On this barge will be a framework 41 including uprights and crossbeams to facilitate laying the platform 1. The barge can be removed by admitting water to bunkers, or loading it with ballast to lower it enough for clearance, the framework 41 being removed in whole or in part. The columns are first pulled together at the top by cables on the barge. The piles 2 are sunk into the silt as far as necessary, and Figures 4 and 5 show the piles resting upon the rock line under the silt.

Having described my invention, what I believe to be new is:

1. The method of erecting a structure in a body of water, which consists in floating and moving hollow piles in horizontal positions and with both ends sealed, to a selected location, opening one end of said piles to admit water into said piles and removing air from the interior of said piles to flood portions of said piles to submerge said portions, buoying up the remaining portions of said piles to maintain the remaining portion of each pile above the surface of the water, setting up said piles in substantially upright positions till their open ends rest upon the earth at the bottom under the water, with their opposite ends above the surface of the water, exerting a force laterally against each pile to cause the piles to lean towards each other, uniting the upper portions over said surface and attaching a support to the upper portions at said opposite ends, forming a cavity in the earth adjacent the open end of each pile, pouring concrete through the piles and said open ends to embed said open ends in place upon the bottom and affixing a support to the opposite ends.

2. The method according to claim 1 which includes the additional step of securing the open end of each pile to the bottom by driving a stake in the bottom at said end.

References Cited in the file of this patent

UNITED STATES PATENTS

| Number | Name | Date |
|---|---|---|
| 818,511 | Allen | Apr. 24, 1906 |
| 1,164,085 | Goldsborough | Dec. 14, 1915 |
| 1,245,373 | O'Donnell | Nov. 6, 1917 |
| 1,658,433 | Ellis | Feb. 7, 1928 |
| 1,820,519 | Wertzberger | Aug. 25, 1931 |
| 1,908,217 | Blumenthal | May 9, 1933 |
| 2,077,044 | Grace et al. | Apr. 13, 1937 |
| 2,236,682 | Gross | Apr. 1, 1941 |
| 2,422,168 | Kirby | June 10, 1947 |
| 2,503,516 | Shrewsbury | Apr. 11, 1950 |
| 2,552,899 | Manes | May 15, 1951 |
| 2,653,451 | McCullough | Sept. 29, 1953 |